Patented Nov. 28, 1939

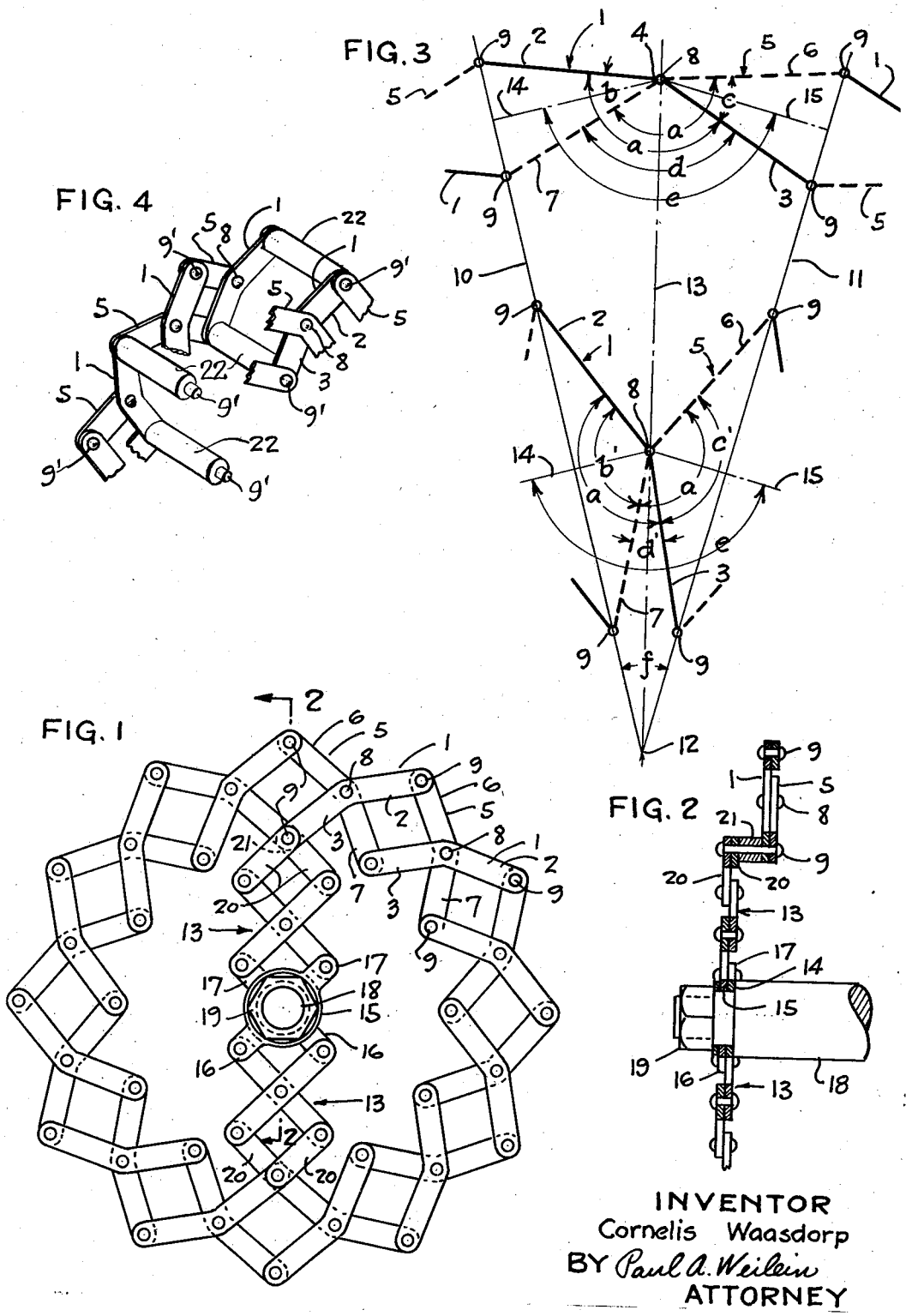

2,181,220

UNITED STATES PATENT OFFICE 2,181,220

MECHANICAL MOVEMENT

Cornelis Waasdorp, Los Angeles, Calif.

Application September 27, 1935, Serial No. 42,517

11 Claims. (Cl. 74—521)

This invention relates to a mechanical movement. This movement in general incorporates a series of pivoted bars, by the aid of which a structure of general circular configuration can be obtained, the size of which can be adjusted as desired, by a force having a radial component.

Such a structure is useful in numerous types of devices, a few of which will be mentioned hereinafter. It is one of the objects of this invention to provide a movement of this character in which a radially directed force serves uniformly to enlarge or reduce the size of the generally circular configuration of the device.

For this purpose, the pivoted bars are so constructed and designed that they form an endless series of crossed bars, which may serve as supports for parts that are desired to be moved generally to conform to circles of varying diameters. It is accordingly another object of this invention to make it possible to alter the size of the enveloping circle defined by elements operated by the device.

As one example of the adaptation of the invention, the mechanical movement may be used to support the elements of the exterior wall of a mold, so that the wall may be expanded uniformly upon operation of the movement, to free the mold from the casting. Again, the mechanical movement may support the elements forming a core, which may be reduced uniformly upon operation of the movement to free the core from the casting.

As a further example, the movement may be used to operate either internal expanding or external contracting brakes, or in general to clutch or chuck generally cylindrical objects either on an external or internal surface.

The expansion and contraction principle can be used for adjusting the effective diameter or spread of such mechanical contrivances as a cylinder reamer, a camera lens diaphragm, an airplane propeller, a variable diameter pulley or sheave, or an idler belt tightener. It may also be used for adjusting or tightening such elements as drum skins; or for operating locking devices for vaults or airtight chambers; or for making false work for structural work readily collapsible, as for concrete tunnels, bridges and culverts.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is an elevation showing in general the correlation of the pivoted bars forming the mechanical movement;

Fig. 2 is a cross section as shown on plane 2—2 of Fig. 1;

Fig. 3 is a diagram illustrating the mode of operation of the mechanical movement; and Fig. 4 is a pictorial view illustrating how a plurality of mechanical movements of the character described can be utilized for expanding and contracting a structure.

In Figs. 1 and 2, there is illustrated a series of bars 1, having legs 2 and 3 of equal length, and pivoted at the central points 4 (Figure 3), to corresponding bars 5, of identical shape as bars 1, and having legs 6 and 7 of equal length. The free ends of legs 2 and 3 are pivotally joined respectively to the free ends of legs 6 and 7 to form generally a pantograph arrangement. Pivot pins 8 are provided for the crossed bars, and pins 9 for the pivotally joined ends. It is clear that if the line joining the pins 9 at the extremity of any one bar would pass through the center of pin 8, and if pin 8 of any bar 1 or 5 were equidistant from pins 9 at the extremities of the bars, then a straight pantograph or "lazy tongs" arrangement would result.

However, in order to accomplish the results of the present invention by the form disclosed in the drawing, the lines joining each pin 9 with the center pin 8 of any bar do not form an angle of 180° when the legs 2 and 3 are of equal length, but a different angle designated by angle $a$; and the arrangement is such that this angle is the same for all bars 1 and 5. The angle $a$ formed between the legs of all of the bars 1 and 5 is disposed so that it in general faces toward the center of the structure.

The effect of this angular arrangement may be best explained in connection with Fig. 3. This figure shows the bars merely as lines; bar 1 is shown in full lines, and bar 5 in dotted lines. Two radial positions are shown. Referring to the upper part of this diagram, it is apparent that legs 2 and 7 form an isosceles triangle with a line 10 joining pivots 9; and this is also true with respect to legs 3 and 6, and the line 11 joining the pivots 9 of legs 3 and 6. These two lines 10 and 11 are non-parallel and intersect say at a point 12. That they are non-parallel can be readily established by elementary geometry; their non-parallel relation is due to the deviation of angle $a$ from 180°. To prove this statement, consider particularly, the upper part of diagram of Fig. 3. In that figure, a line 13 is drawn joining points 12 and 8; and perpendicular lines 14 and 15 are drawn from the common apex of the two triangles respectively to lines 10 and 11. Since these triangles are isosceles triangles, these lines 14 and 15 will respectively bisect the angles at the apexes of the triangles. The angle at the apex of triangle 2—7—10 is designated as angle $b$; that at the apex of triangle 3—6—11 is designated as angle $c$. Angle $d$, between legs 3 and 7, can be expressed as follows:

$$d = a - b = a - c$$

Since $a-b=a-c$, it is clear that angle $b$ is always equal to angle $c$, no matter what the relative angular positions of bars 1 and 5 may be. Furthermore, the angle $e$ between lines 14 and 15 is equal to:

$$d + \tfrac{1}{2}b + \tfrac{1}{2}c$$

and since $b$ and $c$ are equal, this means that angle $e$, between the altitude lines 14 and 15, is equal to $d+b$. This however is equal to angle $a$, which is less than 180°. Accordingly, lines 14 and 15 do not form 180°, and perpendiculars 10 and 11 drawn at their extremities must be non-parallel, and must meet at a point, such as 12.

Considering the four-sided figure formed by lines 14, 15, 10 and 11, it is seen that since the angles between lines 14 and 10, and between lines 15 and 11 are right angles, the angle $f$ between lines 10 and 11 must equal 360°—90°—90°—angle $e$, or 180°—angle $e$. But since angle $e$ has been shown to be equal to angle $a$, this angle $f$ is equal to 180°—angle $a$; that is, this angle between the lines joining the pivots 9 is a constant, irrespective of the angular relation between bars 1 and 5.

Thus for example, as shown in the lower portion of Fig. 3, although center point 8 has moved radially inwardly, and although angles $b'$ and $c'$ (corresponding to angles $b$ and $c$ in the expanded position) are increased, yet angle $f$ has remained constant; that is true because angle $e$ between the bisectors of the apex angles $b'$ and $c'$ has remained constant and equal to angle $a$.

This analysis regarding one pair of bars 1 and 5 is true of all the other pairs which are mutually pivoted at points 9, so that all of the lines such as 10 and 11 passing through these pairs of pivots converge at a common point 12.

The theoretical limits of contraction and expansion are obvious from the diagram of Fig. 3. The contraction cannot go further than to bring pivots 9 together at point 12. The practical limits are narrower due to the physical width of bars 1 and 5. Furthermore, by choosing angle $f$ to be exactly divisible in 360°, the structure may form a closed circle for the end bars may be re-entrant. Thus in the case illustrated, angle $f$ is 30°, and therefore angle $a$ must be 150°. These values however may be altered so as to provide fewer or more sets of pivoted bars 1 and 5 to form the circle.

Reverting to Figs. 1 and 2, the movement is shown as mounted by the aid of a lazy-tongs device 13 on a supporting shaft 18, which may be stationary or rotatable. This device 13 is formed of cross bars for applying a radial force at two diametrically opposite pivot pins 9. It is supported on the shaft by the aid of a pair of flat washer-like elements 14 and 15 having respectively diametrically opposite ears 16 and 17, and a central aperture passing over the shaft 18. By rotating the collars or elements 14 and 15, to vary the angle between ears 16 and 17, the tongs can be expanded or contracted to expand or contract the ring. A nut 19 can serve to hold the structure in any adjusted position. The extreme bars 20 of the tongs 13 can be pivoted to the corresponding pins 9, and a spacer 21 may, if desired, be provided between these bars and the corresponding bars 1 and 5.

It is of course understood that the mechanical movement may support appropriate instrumentalities which are to be radially expanded and contracted; and if necessary, a number of structures can be used, coaxially arranged and joined by stiffeners or spacers at intervals. For example, in Fig. 4 a fragmentary view is shown, illustrating stiffener spacers in the form of rods 22 which may be provided between adjacent structures and which carry the reduced portions 9'.

I claim:

1. In a mechanical movement, a series of pairs of crossed bars pivoted where they cross, the extremities of adjacent pairs being pivotally joined to form a substantially circular structure, the axes of the pivotal connections being substantially in parallelism with the axis of the structure, and the angle formed between the pivot of each bar and the pivot points at the bar extremities being less than 180°.

2. In a mechanical movement, a series of pairs of crossed bars centrally pivoted where they cross, the extremities of adjacent pairs being pivotally joined, the angle formed between the central pivot of each bar and the pivot points at the bar extremities being less than 180°, and the distances between the central pivot and the pivots at the extremities being equal for all bars.

3. In a mechanical movement, a series of pairs of crossed bars centrally pivoted where they cross, the extremities of adjacent pairs being pivotally joined, the angle formed between the central pivot of each bar and the pivot points at the bar extremities being less than 180°, and the distances between the central pivot and the pivots at the extremities being equal for all bars, the said angle being such that the series of bars may be joined to form a closed series.

4. In a device of the character described, a series of pairs of crossed bars, pivoted where they cross, the extremities of adjacent pairs being pivotally joined, the series forming a substantially circular closed structure, the axes of the pivotal connections and structure axis being in substantial parallelism.

5. The combination of a number of structures such as defined in claim 1, in spaced parallel relation and joined by the aid of the pivots.

6. The combination of a number of structures such as defined in claim 3, in spaced coaxial relation, and spacers joining some of the corresponding bars of the structures.

7. In a mechanical movement, a series of pairs of crossed bars centrally pivoted where they cross, the extremities of adjacent pairs being pivotally joined to form a substantially circular structure, the axis of the pivotal connections being substantially in parallelism with the axis of the structure, the angle formed between the central pivot of each bar and the pivot points at the bar extremities being less than 180°, and the distances between the central pivot to the pivots at the extremities being equal for all bars.

8. In a mechanical movement, a series of pairs of crossed bars centrally pivoted where they cross, the extremities of adjacent pairs being pivotally joined to form a closed substantially circular structure, the axis of the pivotal connections being substantially in parallelism with the axis of the structure, the angle formed between the central pivot of each bar and the pivot points at the bar extremities being less than 180°, and the distances between the central pivot to the pivots at the extremities being equal for all bars.

9. In a mechanical movement, a series of pairs of crossed bars pivoted where they cross, the extremities of adjacent pairs being pivotally joined to form a substantially continuous arcuate structure, the axes of the pivotal connections being substantially in parallelism with the structure axis.

10. A mechanical movement as defined in claim 1, including means within the structure for supporting the same, said means including instrumentalities for expanding or contracting said structure.

11. A mechanical movement as defined in claim 1, including a shaft coaxial with said structure, means movable on the shaft, and means interconnecting said movable means with said structure for expanding or contracting the same.

CORNELIS WAASDORP.